United States Patent
Griffith et al.

(10) Patent No.: US 9,132,912 B2
(45) Date of Patent: Sep. 15, 2015

(54) AUTOMATED TAKE OFF CONTROL SYSTEM AND METHOD

(71) Applicant: HONEYWELL INTERNATIONAL INC., Morristown, NJ (US)

(72) Inventors: Scot Griffith, Glendale, AZ (US); Kent Stange, Phoenix, AZ (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 0 days.

(21) Appl. No.: 13/846,532

(22) Filed: Mar. 18, 2013

(65) Prior Publication Data
US 2013/0274965 A1 Oct. 17, 2013

Related U.S. Application Data

(62) Division of application No. 12/539,438, filed on Aug. 11, 2009, now abandoned.

(51) Int. Cl.
*G06F 19/00* (2011.01)
*B64C 19/00* (2006.01)
*G05D 1/06* (2006.01)

(52) U.S. Cl.
CPC .............. *B64C 19/00* (2013.01); *G05D 1/0661* (2013.01)

(58) Field of Classification Search
CPC ............. G06G 7/70; G06G 7/76; G05D 1/00; G05D 3/00; G01C 23/00; B64G 1/36
USPC ..................... 701/2, 3, 13, 15, 120
See application file for complete search history.

(56) References Cited

U.S. PATENT DOCUMENTS 6,133,857 A * 10/2000 Millard et al. ............... 340/959
2006/0214063 A1 * 9/2006 Firuz et al. .................. 244/175
2008/0215198 A1 * 9/2008 Richards ...................... 701/15

* cited by examiner

*Primary Examiner* — Kim T Nguyen
(74) *Attorney, Agent, or Firm* — Ingrassia Fisher & Lorenz, P.C.

(57) ABSTRACT

Methods and systems for operating an avionics system onboard an aircraft are provided. In one embodiment, data associated with a take off roll is received, one or more v-speeds of the aircraft associated with the take off roll are calculated, and during the take off roll, the aircraft is controlled based on the one or more calculated v-speeds.

12 Claims, 3 Drawing Sheets

AUTOMATED TAKE OFF CONTROL SYSTEM AND METHOD

CROSS REFERENCE TO RELATED APPLICATIONS

This application is a divisional application of U.S. patent application Ser. No. 12/539,438, filed Aug. 11, 2009, which is incorporated herein by reference in its entirety.

TECHNICAL FIELD

The present invention generally relates to avionics systems, and more particularly relates to avionics systems with automated take off capabilities.

BACKGROUND

Despite of the ever increasing sophistication of avionics systems, take off remains one of the most complicated and difficult functions required by aircraft personnel. In order to safely perform a take off procedure, personnel must confirm that the aircraft is property configured, appropriately respond to unpredicted changes in performance, be aware of obstacles on the runway regardless of the weather conditions, and properly control the various axes of the aircraft, including the pitch of the aircraft so as to prevent the tail of the aircraft from touching the ground.

Accordingly, it is desirable to provide a system and method for at least partially automating some of the procedures of aircraft take off to improve safety and reduce training costs. Furthermore, other desirable features and characteristics of the present invention will become apparent from the subsequent detailed description and the appended claims, taken in conjunction with the accompanying drawings and the foregoing technical field and background.

BRIEF SUMMARY

A methods and systems are provided for operating an avionics system on-board an aircraft. In one embodiment, a method for controlling an aircraft during an automated take off is provided. Data associated with the aircraft during a take off roll is received. One or more v-speeds of the aircraft associated with the take off roll are calculated. During the take off roll, the aircraft is controlled based on the one or more calculated v-speeds.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-3 are merely illustrative and may not be drawn to scale.

Systems and methods in accordance with various aspects of the present invention provide an improved signal processing schemes. In this regard, the present invention may be described herein in terms of functional block components and various processing steps. It should be appreciated that such functional blocks may be realized by any number of hardware, firmware, and/or software components configured to perform the specified functions.

For example, the present invention may employ various integrated circuit components, such as memory elements, digital signal processing elements, look-up tables, databases, and the like, which may carry out a variety of functions, some using continuous, real-time computing, under the control of one or more microprocessors or other control devices. Such general techniques and components that are known to those skilled in the art are not described in detail herein.

Figure 1:
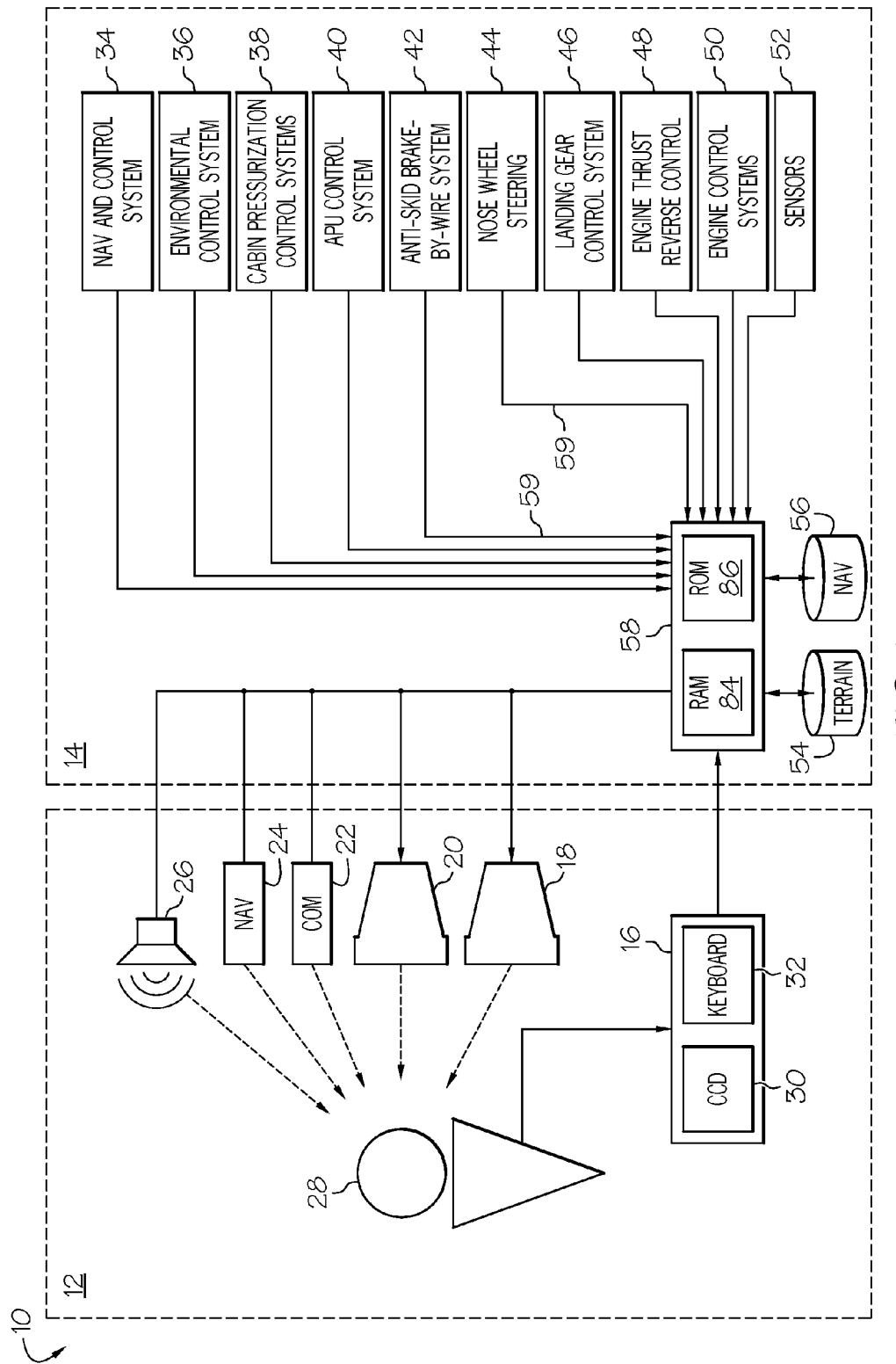
FIG. 1 is a block diagram schematically illustrating an vehicle according to one embodiment of the present invention.
Figure 2:
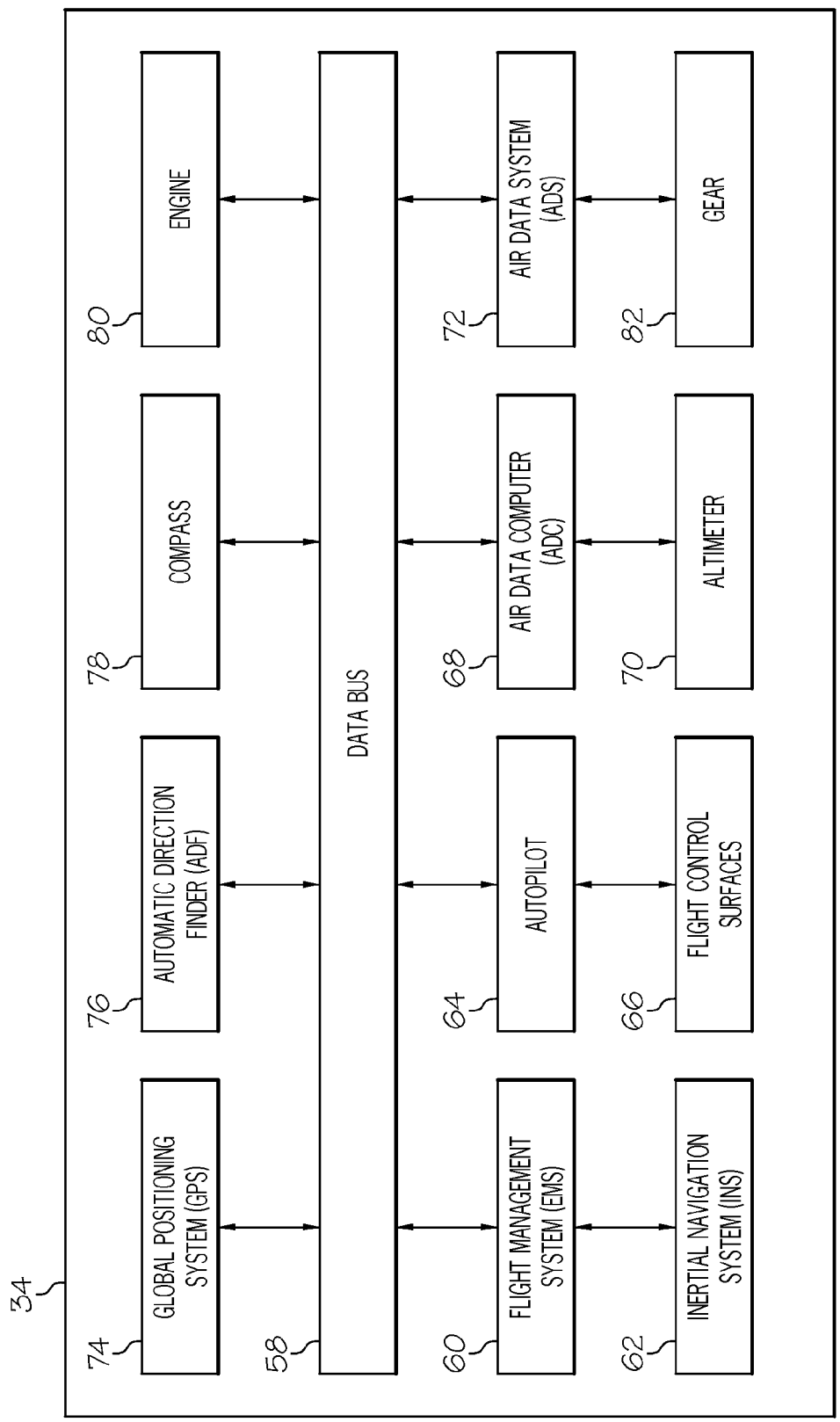
FIG. 2 is a block diagram of a navigation and control system within the vehicle of FIG. 1.
Figure 3:
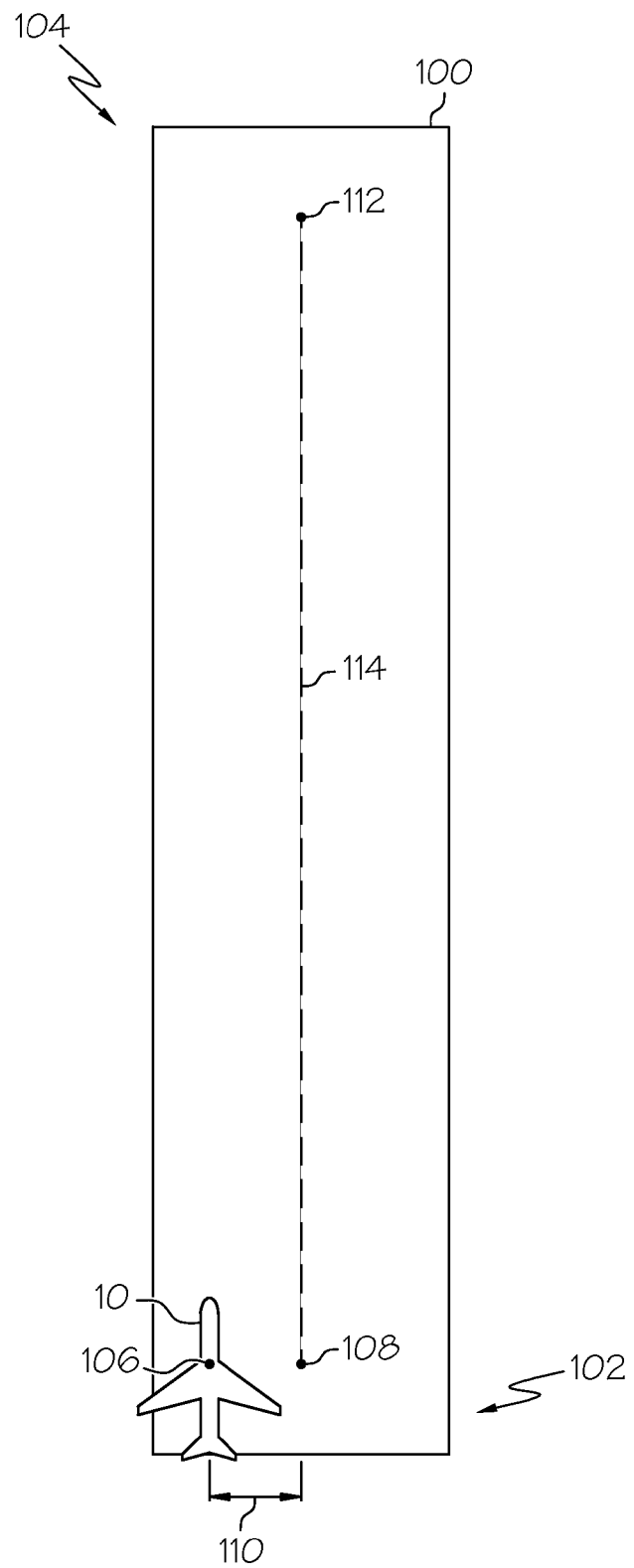
FIG. 3 is a plan view representing the position of the vehicle of FIG. 1 relative to a runway.

FIG. 1 to FIG. 3 illustrate systems and methods for operating an avionics system to enable the automated take of aircraft. In one embodiment, one or more indications of a position (and/or orientation/heading) of the aircraft (e.g., from a Global Positioning Satellite (GPS) system or an inertial navigations system) is received. The position of the aircraft is calculated based on the one or more indications of the position of the aircraft. The calculated position is compared to navigational information stored in the avionics system to establish whether the calculated position is suitable for initiating a take off roll path (e.g., whether the calculated position is within a predetermined distance of an ideal position for initiating a take off roll). An indication of the comparison of the calculated position to the navigational information is generated (e.g., an audible or visual signal) and provided to a user (e.g., the pilot).

FIG. 1 schematically illustrates a vehicle 10, such as an aircraft, in which the method and system described below may be implemented, according to one embodiment of the present invention. The vehicle 10 may be, in one embodiment, any one of a number of different types of aircraft such as, for example, a private propeller or jet engine driven airplane, a commercial jet liner, or a helicopter. In the depicted embodiment, the aircraft 10 includes a flight deck 12 (or cockpit) and an avionics/flight system 14. Although not specifically illustrated, it should be understood that the vehicle aircraft also includes a frame or body to which the flight deck 12 and the avionics/flight system 14 are connected, as is commonly understood.

As shown in FIG. 1, the flight deck 12 includes a user interface 16, display devices 18 and 20 (e.g., a display screen for a flight management system (FMS) and a primary flight display (PFD)), a communications radio 22, a navigational radio 24, and an audio device 26. The user interface 16 is configured to receive manual input from a user 28 and, in response to the user input, supply command signals to the avionics/flight system 14.

It should be understood that the user 28 may refer to various types of personnel, such as a pilot or crewperson or a technician or other maintenance engineer.

The user interface 16 may be any one, or combination, of various known flight control devices and user interface/text entry devices including, but not limited to, a cursor control device (CCD), such as a mouse, a trackball, or joystick, and/or a keyboard, one or more buttons, switches, or knobs. As such, the user interface 16 may include a text entry device comprising any device suitable to accept alphanumeric character input from user 28 and convert that input to alphanumeric text on the displays 18 and 20. In the depicted embodiment, the user interface 16 includes a CCD 30 and a keyboard 32. The user 28 uses the CCD 30 to, among other things, move a cursor symbol on the display devices 18 and 20, and may use the keyboard 32 to, among other things, input textual data.

Still referring to FIG. 1, the display devices 18 and 20 are used to display various images and data, in graphic, iconic, and/or textual formats, and to supply visual feedback to the user 28 in response to user input commands supplied by the user 28 to the user interface 16. One or more of the displays 18 and 20 may further be a control display unit (CDU), a multi-function control display unit (MCDU), or a graphical display. It will be appreciated that the display devices 18 and 20 may each be implemented using any one of numerous known displays suitable for rendering image and/or text data in a format viewable by the user 28, such as a cathode ray tube (CRT) displays, a LCD (liquid crystal display), a TFT (thin film transistor) displays, or a heads up display (HUD) projection.

The communication radio 22 is used, as is commonly understood, to communicate with entities outside the aircraft 10, such as air-traffic controllers and pilots of other aircraft. The navigational radio 24 is used to receive from outside sources and communicate to the user various types of information regarding the location of the vehicle, such as Global Positioning Satellite (GPS) system and Automatic Direction Finder (ADF) (as described below). The audio device 26 is, in one embodiment, an audio speaker mounted within the flight deck 12.

The avionics/flight system 14 includes a navigation and control system (or subsystem) 34, an environmental control system (ECS) 36, a cabin pressurization control system (CPCS) 38, an auxiliary power unit (APU) control system 40, an anti-skid brake-by-wire system 42, a nose wheel steering system 44, a landing gear control system 46, an engine thrust reverse control system 48, various other engine control systems 50, a plurality of sensors 52, one or more terrain databases 54, one or more navigation databases 56, and a processor 58. The various components of the avionics/flight system 14 are in operable communication via sensor inputs (e.g., analog sensor inputs) 59 (or a data or avionics bus).

FIG. 2 illustrates the navigation and control system 34 in greater detail. The navigation and control system 34, in the depicted embodiment, includes a flight management system (FMS) 60, an inertial navigation system (INS) 62, an autopilot or automated guidance system 64, multiple flight control surfaces (e.g., ailerons, elevators, and a rudder) 66, an Air Data Computer (ADC) 68, an altimeter 70, an Air Data System (ADS) 72, a Global Positioning System (GPS) module 74, an automatic direction finder (ADF) 76, a compass 78, at least one engine 80, and gear (i.e., landing gear) 82.

Of particular interest in FIG. 2, although not shown in detail, the INS 62 includes multiple inertial sensors, such as accelerometers and gyroscopes (e.g., ring laser gyros), that are configured to calculate, and detect changes in, the position, orientation, and velocity of the aircraft 10, as is commonly understood.

Referring again to FIG. 1, as is commonly understood, the ECS 36 and the CPCS 38 may control the air supply and temperature control, as well as the cabin pressurization, for the flight deck 12 (and the passenger compartment) of the aircraft 10. The ECS 36 may also control avionics cooling, smoke detection, and fire suppression systems.

The APU control system 40 manages the operation of an APU (not shown), which provides power to various systems of the aircraft 10 (e.g., other than propulsion). The anti-skid brake-by-wire system 42 controls the wheel brakes (not shown) during take off and landing so as to prevent the wheel from losing traction with the ground. The nose wheel steering system 44 and the landing gear control system 46 control (e.g., in combination with input from the user 28) the landing gear to provide both direction control of the aircraft 10 when on the ground and raise and lower the landing gear during take off and landing approach.

The engine thrust reverse control system 48 and other engine control systems 50 manage the operation of the engines during all stages of operation (e.g., take-off, in flight, and during landing). Although not illustrated, the sensors 52 may include, for example, a barometric pressure sensor, a thermometer, a wind speed sensor, and an angle of attack sensor, as is commonly understood.

The terrain databases 54 include various types of data representative of the terrain over which the aircraft 10 may fly. The navigation (and/or avionics) databases 56 include various types of data required by the system, for example, state of the aircraft data, flight plan data, data related to airways, waypoints and associated procedures (including arrival and approach procedures) navigational aids (Navaid), symbol textures, navigational data, obstructions, font textures, taxi registration, special use airspace, political boundaries, communication frequencies (en route and airports), approach info, and the like.

The processor (or processing system) 58 may be any one of numerous known general-purpose microprocessors or an application specific processor that operates in response to program instructions. In the depicted embodiment, the processor 58 includes on-board random access memory (RAM) 84 and on-board read only memory (ROM) 86. The program instructions that control the processor 58 may be stored in either or both the RAM 84 and the ROM 86 (or another computer-readable medium) and may include instructions for carrying out the processes described below. For example, the operating system software may be stored in the ROM 86, whereas various operating mode software routines and various operational parameters may be stored in the RAM 84. It will be appreciated that this is merely exemplary of one scheme for storing operating system software and software routines, and that various other storage schemes may be implemented. It will also be appreciated that the processor 58 may be implemented using various other circuits, not just a programmable processor. For example, digital logic circuits and analog signal processing circuits could also be used.

It should also be noted that the aircraft 10 is merely exemplary and could be implemented without one or more of the depicted components, systems, and data sources. It will additionally be appreciated that the aircraft 10, the flight deck, and/or the avionics/flight system 14 could be implemented with one or more additional components, systems, or data sources, some of which are mentioned below.

According to one aspect of the present invention, indications (or indicators) of a position (and/or orientation) of the aircraft 10 are received from one ore more sources, such as the GPS system 74, the INS 62, and/or the user interface 16. The position of the aircraft 10 is calculated based on the received indications. The position (or the calculated position) is compared to navigational information stored in, for example, the navigation databases 56 to determine whether the calculated position is suitable for initiating a take off roll path. That is, it is determined whether the calculated position is within a predetermined distance of an ideal position (i.e., at an end of a runway) for initiating a take off roll. An indication of the comparison of the calculated position to the navigational information is generated and provided to a user (e.g., the pilot).

If the calculated position is determined to be suitable for initiating a take off roll, A take off roll path may then be generated from the ideal initiation positions and the geographical runway and terrain information from the databases 54 and 65. This path would an ideal path for the take off roll through lift off and climb to a predetermined height or abort and deceleration to safe speed. The processor 58 may then control the aircraft 10 to automatically take off, while monitoring (e.g., using the INS 62) the actual position and performance of the aircraft in relation to the generated take off roll path. If the aircraft 10 deviates from the take off roll path and/or ideal performance, the system may automatically correct the operation of the aircraft 10 (e.g., yaw and/or pitch control) and/or abort the take off altogether.

FIG. 3 illustrates the aircraft 10 in relation to a runway 100 (not drawn to scale). In one embodiment, the aircraft 10 is taxied (e.g., manually) to a first end 102 of the runway 100. The system (e.g., the processor 58) then receives various indications of the position of the aircraft 10. Examples of position indicators include, but are not limited to, coordinates from the GPS system 74, an estimated position and orientation from the INS 62, an estimated position determined using radio navigation, a heading of the aircraft 10 determined using the compass 78, and a position of the aircraft 10 relative to the center of the runway 100 determined using the localizer radio guide associated with the runway 100, as is commonly understood. As another example of a position indicator, the user 28 may manually enter a confirmation of the position of the aircraft 10 using the user interface 16 when he or she believes the aircraft 10 is appropriately positioned, based on, for example, visual observations (i.e., made by the user 28 and/or ground personnel).

Based on the received indications, the system then calculates (or determines) the "actual" position 106 of the aircraft 10. The calculation of the position 106 of the aircraft 10 may weight each of the indications based on the assumed reliability of each (e.g., the GPS coordinates may be more heavily weighted than the visual confirmation made by the user 28).

The calculated position 106 is then compared to navigational data stored in the navigation database 56. In particular, the calculated position 106 may be compared to an ideal take off roll initiation position 108 of the runway 100 nearest runway (i.e., a position at the center of the runway 100 near the first end 102). As is commonly understood, the navigation database 56 includes navigational coordinates corresponding to various portions of runways, as well as other characteristics of the runways, such as slope. The comparison the calculated position 106 to the ideal take off roll initiation position 108 may result in a lateral (or yaw) offset 110 (i.e., a distance between the calculated position 106 and the ideal take off roll initiation position 108).

If the lateral offset 110 is above a predetermined threshold (e.g., 3 meters), the system may generate an indication (e.g., using the audio device 26 and/or one of the display devices 18 and 20) to alert the user 28 that the aircraft 10 is not in a position suitable to initiate a take off roll. The system may also automatically override any attempts to take off from the calculated position (e.g., by cutting or reducing power to the engine 80).

If the lateral offset 110 is below the predetermined threshold, the system may provide an appropriate indication to the user 28 before continuing preparations for take off The system then determines the centerline intersection point 112 near the second end 104 of the runway 100 (i.e., and/or a "lift off"

position at the center of the runway 100 near the second end 104), by accessing the navigation database 56. Using the positions 108 and 112 a take off roll path 114 is then calculated.

As shown in FIG. 3, the take off roll path 114 may essentially correspond to a centerline of the runway 100. However, in some embodiments, the take off roll path 114 may also include information concerning the appropriate speeds of the aircraft 10 at different locations along the path 114 during take off, as well as suitable rotation rates (i.e., in pitch) depending on the speed and weight of the aircraft entered into the FMS 60. Additionally, the system may confirm that the aircraft 10 is suitably configured for take off (e.g., proper flap settings).

During take off, the system commands the servos associated with various control systems (e.g., the engine 80, the flight control surfaces 66, the nose wheel steering subsystem 44, etc.) such that the take off is at least partially automated to follow the calculated take off roll path 114. For example, as the aircraft 10 accelerates towards the second end 104 of the runway 100, the yaw (and nose wheel steering) may be automatically controlled to navigate the aircraft 10 along the calculated take off roll path 114. In the example shown in FIG. 3, this may include steering the aircraft 10 slightly starboard at the initiation of the take off roll to overcome the lateral offset 110.

In one embodiment, the system also monitors the position and performance of the aircraft 10 during take off and, in real-time, compares it to the calculated take off roll path 114. If deviations from the take off roll path 114 are detected, such as by using the INS 62 and/or the compass 78, corrections may be made to keep the aircraft 10 on the calculated take off roll path 114. That is, the system operates in a "closed-loop" fashion to keep the aircraft on the take off roll path 114 as much as possible, including maintaining appropriate speeds and rotation rates.

Additionally, the system may abort take off if certain conditions are detected (and/or particular thresholds are exceeded). Examples of such conditions include, but are not limited to, insufficient speed and/or acceleration, lack of runway length remaining, extreme deviation from the take off roll path 114, and poor engine performance. Also, the aircraft 10 may utilize various subsystems (e.g., a Runway Awareness and Advisory System (RAAS), as is commonly understood) and sensors (e.g., infra-red or electro-optical cameras) to detect the presence of unauthorized objects on the runway 100, such as other aircraft, and suitably abort the take off if such objects are detected.

Real-time results of the monitoring of the aircraft performance may also be display to the user 28 via one of the display devices 18 and 20 (e.g., a HUD) in such a way as to aid the user 28 if he or she determines that manual intervention is required to keep the aircraft 10 on the take off roll path 114. For example, a visual indicator of the lateral position of the aircraft 10 relative to the take off roll path 114 may be displayed to alert the user 28 of poor performance.

According to another aspect of the present invention, a method for controlling an aircraft during an automated take off is provided, in which the aircraft is controlled to a specified angle of attack, as opposed to simply a pitch angle. In such an embodiment, a desired angle of attack for the aircraft is determined (e.g., in real-time). During the automated take off, the pitch of the aircraft is adjusted such that an actual angle of attack of the aircraft is substantially the same as the desired angle of attack of the aircraft (e.g., the actual angle of attack tracks the desired angle of attack in real-time).

As will be appreciated by one skilled in the art, the angle of attack refers to the angle between a center, chord line of an airfoil (e.g., a wing) and the relative direction of motion of the air mass (and/or the wind) and is related to the ratio of the amount of lift created and drag generated by the airfoil. As such, the desired angle of attack may be determined by first selecting a particular v-speed, or velocity-speed, as a desired performance characteristic of the aircraft 10. As is commonly understood, v-speeds are typically set by performance criteria required by the aviation regulatory authorities for specific types of aircraft. Examples include the speed that allows for the maximum rate of climb ($V_Y$), the speed that allows for the highest angle of climb ($V_X$), the speed at which the aircraft 10 is rotated (i.e., pitched) during take off ($V_R$), and the maximum speed at which the take off may be aborted ($V_1$).

In one embodiment, an angle of attack is determined based on, for example, desired performance. During take off, the system monitors the angle of attack (e.g., using a signal generated by the angle of attack sensor) and controls the pitch of the aircraft (e.g., using the elevators and pitch trim devices) such that the actual angle of attack obtains, or nearly obtains, the desired magnitude (i.e., the desired angle of attack). Limits may be imposed on the pitch of the aircraft such that the aircraft is not operated in an undesirable manner (e.g., pitched at 90° or in a way that the tail might tail strike). This method may be used in conjunction with the other methods described above.

According to a further aspect of the present invention, a method for controlling an aircraft during an automated take off is provided in which v-speeds (e.g., those described above) are automatically calculated and used to control the aircraft. In such an embodiment, data associated with the aircraft during a take off roll is received. One or more v-speeds of the aircraft associated with the take off roll are calculated. During the take off roll, the aircraft is controlled based on the one or more calculated v-speeds.

In one embodiment, the particular v-speeds are automatically calculated from, for example, information entered into the system by a user (e.g., estimated weight of the aircraft), environmental conditions (e.g., temperature, relative humidity, and barometric pressure) as detected by various sensors, and geographical data about the particular runway in use (e.g., the presence of terrain features and/or restricted airspace). The calculated v-speeds are then used during the automated take off procedure. The calculated v-speeds may be updated due to detected real-time aircraft performance, and used to override estimated v-speeds entered by the user. For example, the user may estimate that $V_R$ is 140 mph. However, the system may determine that the actual weight of the aircraft is greater than that entered (e.g., by slow acceleration), re-calculate $V_R$ to be 160 mph, and delay rotation until the aircraft has reached such a speed during take off roll in order to prevent the tail from touching the ground (i.e., a tail strike). The system may then provide an indication to the pilot (e.g., using the display devices 18 and 20) that the estimated $V_R$ was incorrect and overridden during take off. This method may be used in conjunction with the other methods described above, and as such, may be implemented in real-time and used to control the aircraft during automated take off.

The method and system described above may offer many advantages over conventional avionics system. One advantage is that the required minimum visual range may be reduced. As a result, the likelihood of take off being delayed because of weather may be reduced. Another advantage is that because of the increased automation of take off procedures, the costs involved with properly training personnel may be reduced. Further, the likelihood that the aircraft will experience any runway excursions and tail strikes is reduced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling an aircraft during an automated take off, the method comprising:
   receiving realtime data associated with the aircraft during a take off roll;
   calculating, by a processor, one or more v-speeds of the aircraft associated with the take off roll based on the realtime data; and
   during the take off roll, controlling the aircraft based on the one or more calculated v-speeds.

2. The method of claim 1, wherein the received data further comprises at least one of environmental conditions, and geographical data.

3. The method of claim 2, wherein calculating of the one or more v-speeds comprises continuously computing the one of more v-speeds in real-time.

4. The method of claim 2, further comprising aborting the take off if any of the received data exceeds a predetermined threshold.

5. The method of claim 2, further comprising receiving one or more estimated v-speeds from a user input device on-board the aircraft.

6. The method of claim 5, further comprising:
   comparing the one or more calculated v-speeds to the one or more estimated v-speeds; and
   generating an indication if a difference between the one or more calculated v-speeds and the one or more estimated v-speeds is greater than a predetermined threshold.

7. A system for controlling an aircraft during an automated take off, the system comprising:
   a computer processor that:
      receives realtime data associated with the aircraft during a take off roll, and
      that calculates one or more v-speeds of the aircraft associated with the take off roll based on the realtime data; and
   a navigation and control system that,
   during the take off roll, controls the aircraft based on the one or more calculated v-speeds.

8. The system of claim 7, wherein the received data further comprises environmental conditions, and geographical data.

9. The system of claim 8, wherein the computer processor calculates the one or more v-speeds by continuously computing the one of more v-speeds in real-time.

10. The system of claim 8, wherein the navigation and control system aborts the take off if any of the received data exceeds a predetermined threshold.

11. The system of claim 8, wherein the computer processor receives one or more estimated v-speeds from a user input device on-board the aircraft.

12. The system of claim 11, wherein computer processor compares the one or more calculated v-speeds to the one or more estimated v-speeds; and generates an indication if a difference between the one or more calculated v-speeds and the one or more estimated v-speeds is greater than a predetermined threshold.

\* \* \* \* \*